US010291812B2

(12) United States Patent
Narita

(10) Patent No.: US 10,291,812 B2
(45) Date of Patent: May 14, 2019

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Tateki Narita, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/494,897

(22) Filed: Apr. 24, 2017

(65) Prior Publication Data

US 2017/0310844 A1 Oct. 26, 2017

(30) Foreign Application Priority Data

Apr. 26, 2016 (JP) ................................ 2016-088480

(51) Int. Cl.

| | |
|---|---|
| ***H04N 1/04*** | (2006.01) |
| ***H04N 1/203*** | (2006.01) |
| ***H04N 1/00*** | (2006.01) |
| ***H04N 1/193*** | (2006.01) |

(52) U.S. Cl.

CPC ......... *H04N 1/203* (2013.01); *H04N 1/00798* (2013.01); *H04N 1/193* (2013.01); *H04N 2201/0094* (2013.01)

(58) Field of Classification Search

CPC .... H04N 1/203; H04N 1/00798; H04N 1/193; H04N 2201/0094

USPC ......................................................... 358/474

See application file for complete search history.

(56) References Cited

U.S. PATENT DOCUMENTS

| | | | | |
|---|---|---|---|---|
| 8,274,673 | B2 * | 9/2012 | Okumura ........... | H04N 1/00002 358/1.13 |
| 8,576,461 | B2 * | 11/2013 | Nagasaka .............. | H04N 1/203 358/474 |
| 9,369,611 | B2 * | 6/2016 | Morita ................. | H04N 1/6077 |

FOREIGN PATENT DOCUMENTS

| | | |
|---|---|---|
| JP | 2009153052 A | 7/2009 |

* cited by examiner

*Primary Examiner* — Houshang Safaipour

(74) *Attorney, Agent, or Firm* — Rossi, Kimms & McDowell LLP

(57) ABSTRACT

An image processing apparatus having a reading unit that can read both sides of an original in parallel has a processing unit that processes image data obtained by the reading unit reading an original. The apparatus controls to execute processing by the processing unit on image data of a first surface of the original and reading of a second surface of the original in parallel. The apparatus determines whether or not to start processing by the processing unit on image data of the second surface of the original when processing by the processing unit on the image data of the first surface of the original completes, and in accordance with the determination result, the apparatus controls of a start of processing by the processing unit on the image data of the second surface of the original.

11 Claims, 6 Drawing Sheets

FRONT SURFACE REQUEST
BACK SURFACE REQUEST
404
SHEET INTERVAL
READ FIRST ORIGINAL
READ SECOND ORIGINAL
401
READING (FRONT) + IMAGE PROCESSING (FRONT)
READING (BACK)
402

405
IMAGE PROCESSING(BACK)
403

FRONT SURFACE COMPLETION
BACK SURFACE COMPLETION

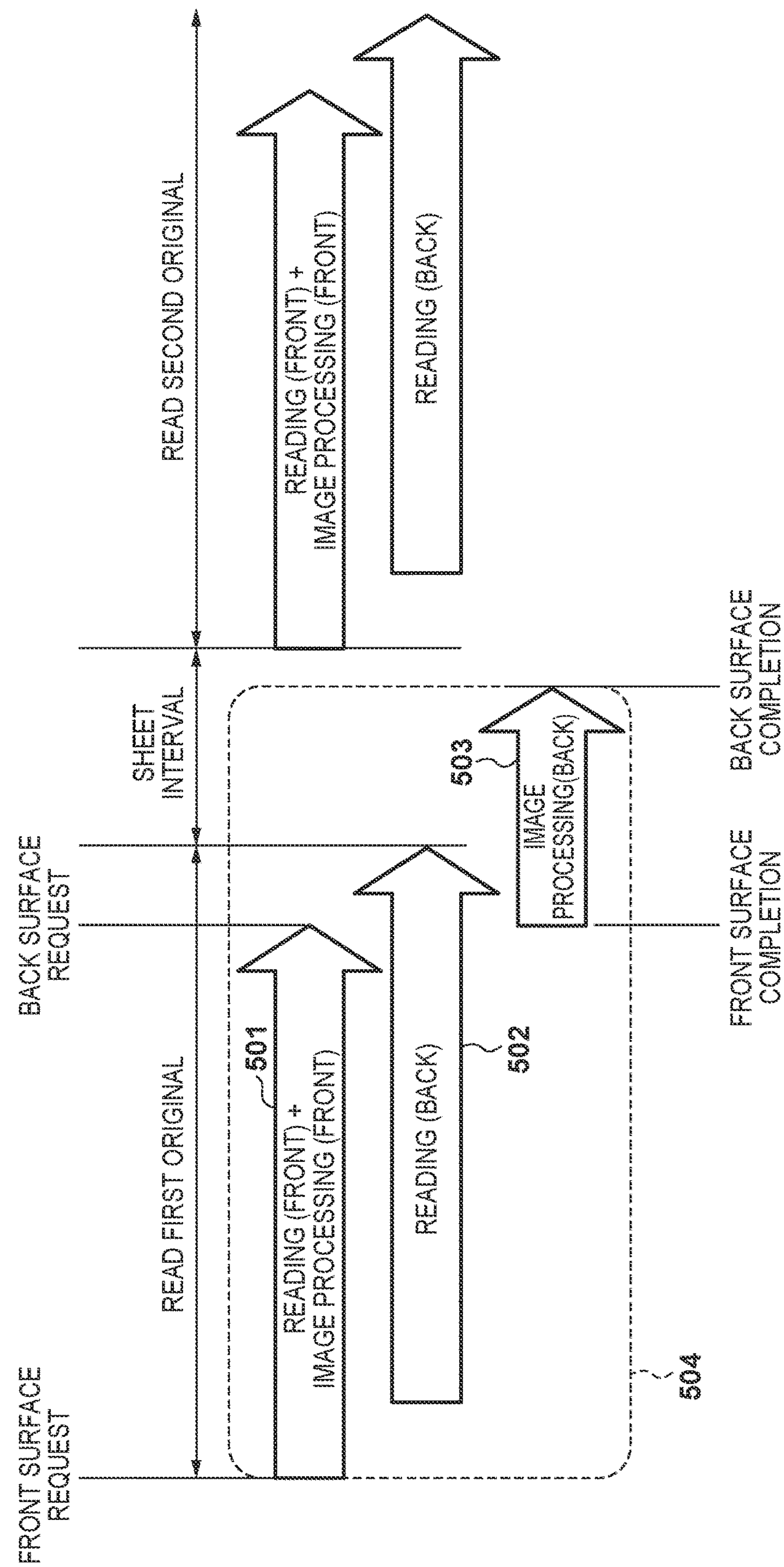
F I G. 5
FRONT SURFACE REQUEST
BACK SURFACE REQUEST
READ FIRST ORIGINAL
SHEET INTERVAL
READ SECOND ORIGINAL
READING (FRONT) + IMAGE PROCESSING (FRONT)
501
READING (BACK)
502
IMAGE PROCESSING(BACK)
503
504
READING (FRONT) + IMAGE PROCESSING (FRONT)
READING (BACK)
FRONT SURFACE COMPLETION
BACK SURFACE COMPLETION

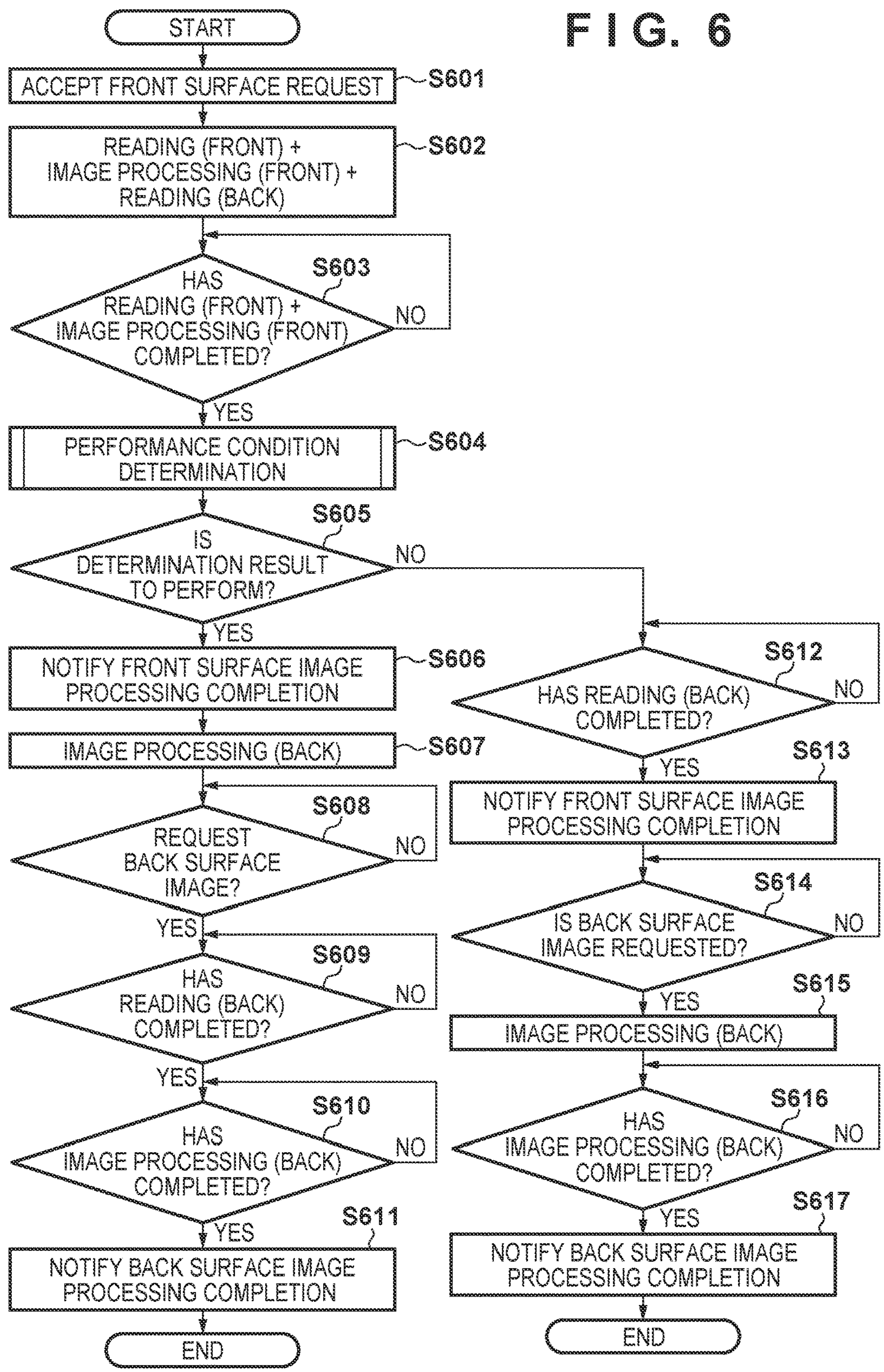
FIG. 6
START
ACCEPT FRONT SURFACE REQUEST
S601
READING (FRONT) + IMAGE PROCESSING (FRONT) + READING (BACK)
S602
HAS READING (FRONT) + IMAGE PROCESSING (FRONT) COMPLETED?
S603
NO
YES
PERFORMANCE CONDITION DETERMINATION
S604
IS DETERMINATION RESULT TO PERFORM?
S605
NO
YES
NOTIFY FRONT SURFACE IMAGE PROCESSING COMPLETION
S606
IMAGE PROCESSING (BACK)
S607
REQUEST BACK SURFACE IMAGE?
S608
NO
YES
HAS READING (BACK) COMPLETED?
S609
NO
YES
HAS IMAGE PROCESSING (BACK) COMPLETED?
S610
NO
YES
S611
NOTIFY BACK SURFACE IMAGE PROCESSING COMPLETION
END
HAS READING (BACK) COMPLETED?
S612
NO
YES
S613
NOTIFY FRONT SURFACE IMAGE PROCESSING COMPLETION
IS BACK SURFACE IMAGE REQUESTED?
S614
NO
YES
S615
IMAGE PROCESSING (BACK)
HAS IMAGE PROCESSING (BACK) COMPLETED?
S616
NO
YES
S617
NOTIFY BACK SURFACE IMAGE PROCESSING COMPLETION
END

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

There are multi-function peripherals (MFP) having a scanner and a printer that have a concurrent both-sided scanner that can concurrently read both front and back sides of an original. The concurrent both-sided scanner has two reading sensors for respectively reading front and back sides of an original while conveying the original, and can obtain image data by concurrently reading images of both front and back sides by the two reading sensors in one conveyance of the original. Therefore, in comparison to a case in which, by one reading sensor, an original is conveyed a plurality of times while causing the original to be reversed to read both sides thereof, higher productivity is achieved. The productivity of concurrent both-sided reading is theoretically expected to be 200% of the productivity when reading one side.

Meanwhile, the MFP performs image processing and compression processing on the image data obtained by the scanner and performs saving or output (transmission to an external unit or printing), and hardware of the MFP is used for this image processing and compression processing. An MFP that has the concurrent both-sided scanner can execute a read operation of an original for both sides at the same time, but for purposes of cost reduction, in most cases does not have sufficient hardware resources, used for the image processing and the compression processing, to enable processing of the image data of both sides in parallel. Consequently, when using the concurrent both-sided scanner to read an original, to raise the productivity thereof, it is necessary to efficiently use the hardware resources used for one side's worth of image processing and compression processing in accordance with the read operation of the concurrent both-sided scanner. In such a case, it is assumed that the image processing and the compression processing by the hardware resources is sufficiently fast in comparison to the read operation of an original by the concurrent both-sided scanner. If a memory region for storing image data before image processing and the compression processing (large data size because it is unprocessed and uncompressed) is sufficiently present, an operation for reading an original is executed separately from image processing and compression processing. In other words, configuration may be taken to successively store in the memory region image data of the front and back of the original before image processing and compression processing, and then successively execute the image processing and the compression processing on the stored image data.

Japanese Patent Laid-Open No. 2009-153052 recites that, in an original reading apparatus that reads the front and back of an original by one conveyance, image data for both sides of the original is transferred after being subject to resolution scaling (reduction) to enable transfer of image data of both sides of a preceding original to finish before reading of a succeeding original starts.

However, a multi-function peripheral that suppresses cost and is referred to as a compact MFP does not have a sufficient memory region for storing image data before image processing and compression processing (the data size is large because it is unprocessed and uncompressed). Therefore, if reading of a succeeding original is started after image data of both sides of an original has been compressed and stored in an image memory for example, an advantage of using the concurrent both-sided scanner is not capitalized on.

In addition, consideration may be given to using a smaller memory region to realize image processing and both-sided reading of an original, by utilizing an original conveyance interval (a sheet interval) between a preceding original and a succeeding original to complete the image processing and compression processing of image data of the preceding original. However, in such a case, there is the problem in that, in accordance with time required for the image processing and the compression processing and an original conveyance interval (the sheet interval), a read operation of the succeeding original is made to wait because the image processing and compression processing on the image data of the preceding original has not completed, and productivity decreases.

SUMMARY OF THE INVENTION

An aspect of the present invention is to eliminate the above-mentioned problems with the conventional techniques.

A feature of the present invention is to provide a technique for, in an image processing apparatus having a reading unit that can read both sides of an original in parallel, efficiently executing reading of an original and processing on image data obtained by the reading.

According to a first aspect of the present invention, there is provided an image processing apparatus having a reading unit that can read both sides of an original in parallel, the apparatus comprising: a processing unit configured to process image data obtained by the reading unit reading an original; a memory storing a set of instructions; and one or more processors that execute instructions of the set of the instructions and cause the image processing apparatus to function as: a control unit configured to execute in parallel processing by the processing unit on image data obtained by the reading unit reading a first surface of the original, and reading of a second surface of the original by the reading unit; and a determination unit configured to determine, when processing by the processing unit on the image data obtained by the reading unit reading the first surface of the original completes, whether or not to start processing by the processing unit on image data obtained by the reading unit reading the second surface of the original, wherein the control unit controls a start of the processing by the processing unit on the image data obtained by the reading unit reading the second surface of the original in accordance with a determination result by the determination unit.

According to a second aspect of the present invention, there is provided a method of controlling an image processing apparatus having a reading unit that can read both sides of an original in parallel, the method comprising: processing image data obtained by the reading unit reading an original; controlling to execute in parallel processing on image data obtained by the reading unit reading a first surface of the original, and reading of a second surface of the original by the reading unit; and determining, when processing on the image data obtained by the reading unit reading the first surface of the original completes, whether or not to start processing on image data obtained by the reading unit reading the second surface of the original, wherein a start of the processing on the image data obtained by the reading unit reading the second surface of the original is controlled in accordance with a determination result.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a time chart for explaining timing when performing concurrent both-sided reading in the image forming apparatus according to the embodiment.

FIG. 6 is a flowchart for describing concurrent both-sided reading processing with respect to one original by the image forming apparatus according to the embodiment.

DESCRIPTION OF THE EMBODIMENTS

Embodiment of the present invention will now be described hereinafter in detail, with reference to the accompanying drawings. It is to be understood that the following embodiment is not intended to limit the claims of the present invention, and that not all of the combinations of the aspects that are described according to the following embodiment are necessarily required with respect to the means to solve the problems according to the present invention.

Note that, in the embodiment, an image processing apparatus of the present invention is explained as an image forming apparatus such as a multi-function peripheral as an example, but the present invention is not limited to this, and it can also be applied to a scanner, a copying machine, a printing apparatus that has a scanner, or the like for example.

Figure 1:
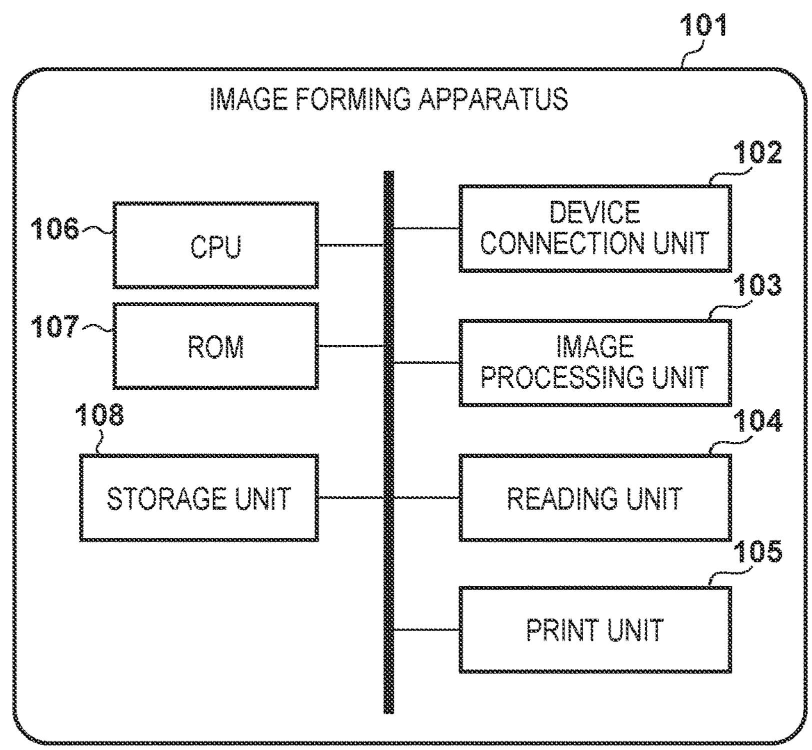
FIG. 1 is a block diagram for explaining a configuration of an image forming apparatus according to an embodiment of the present invention.

FIG. 1 is a block diagram for explaining a configuration of an image forming apparatus 101 according to the embodiment of the present invention. Note that the image forming apparatus 101 according to the embodiment is explained as a multi-function peripheral (MFP) that has a scanner and a printer.

A device connection unit 102 communicates with an external apparatus via a LAN or USB, and performs transmission/reception of data with the external apparatus. An image processing unit 103 uses hardware to perform various image processing and compression processing such as color processing on image data obtained by a reading unit 104 or the device connection unit 102. The reading unit 104 can read an original that is paper media by an optical sensor, and outputs image data of the read original. The reading unit 104 is provided with a concurrent both-sided scanner that can read both sides of an original concurrently, and detail thereof is described later with reference to FIG. 2. A print unit 105 prints an image on printing paper (a sheet) in accordance with image data processed by the image processing unit 103. A CPU 106 executes a boot program stored in a ROM 107 to deploy a program stored in the ROM 107 to a storage unit 108, and executes the deployed program to control operation of the image forming apparatus 101. The storage unit 108 functions as a main memory of the CPU 106, and stores a control program, various variables, image data, or the like.

Figure 2:
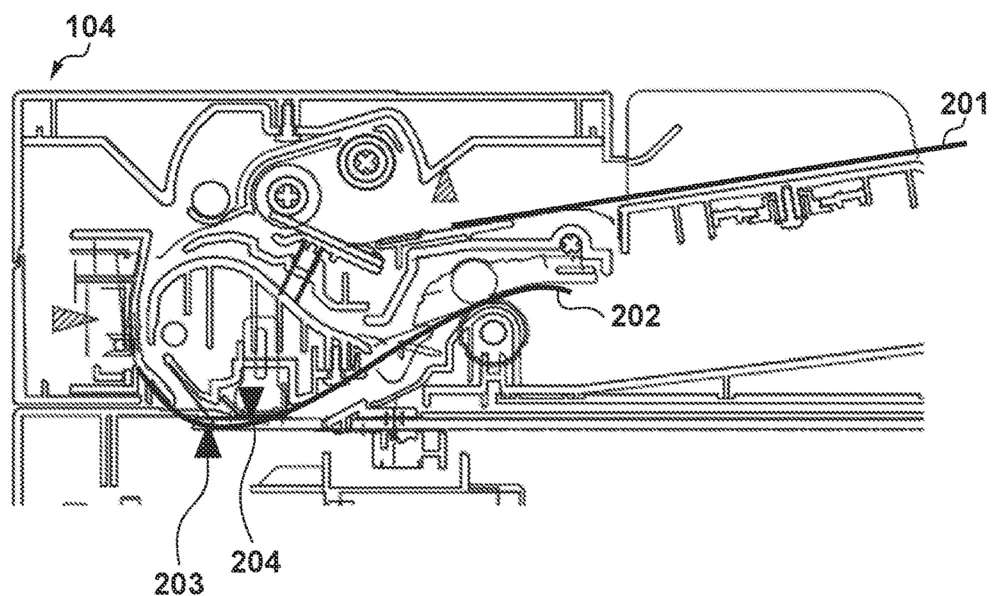
FIG. 2 depicts a cross-sectional view illustrating a configuration of a reading unit of the image forming apparatus according to the embodiment.

FIG. 2 depicts a cross-sectional view illustrating a configuration of the reading unit 104 of the image forming apparatus 101 according to the embodiment.

The reading unit 104 can convey an original to read both sides of the original in parallel. Reading sensors 203 and 204 are reading sensors for a front surface (a first surface) and a back surface (a second surface) of an original, and can obtain image data of both front and back sides of the original in one conveyance of the original. An original 201 is an original before conveyance that a user has set. An original 202 indicates an original that is being conveyed, and reading of both front and back sides of the original 202 is performed by the reading sensors 203 and 204 during this conveyance. The reading sensor 203 is an optical sensor for reading image data of a front surface of an original, has a length in accordance with a width of the original, and reads an image by units of main scanning lines. The reading sensor 203 is arranged for the front surface (the bottom side) of the original 202 that is conveyed. The reading sensor 204 is an optical line sensor for reading image data of a back surface of an original, has a length in accordance with a width of the original, and reads an image by units of main scanning lines. The reading sensor 204 is arranged for the back surface (the top side) of the original 202 that is conveyed. Here, to avoid interference at a time of reading, the reading sensors 203 and 204 are arranged to be shifted by several centimeters with respect to each other in the sub scanning direction (conveyance direction of the original). Image data obtained by the reading sensor 203 and the reading sensor 204 of the reading unit 104 reading both sides of an original in this way are each saved to the storage unit 108 under the control of the CPU 106.

Figure 3A:
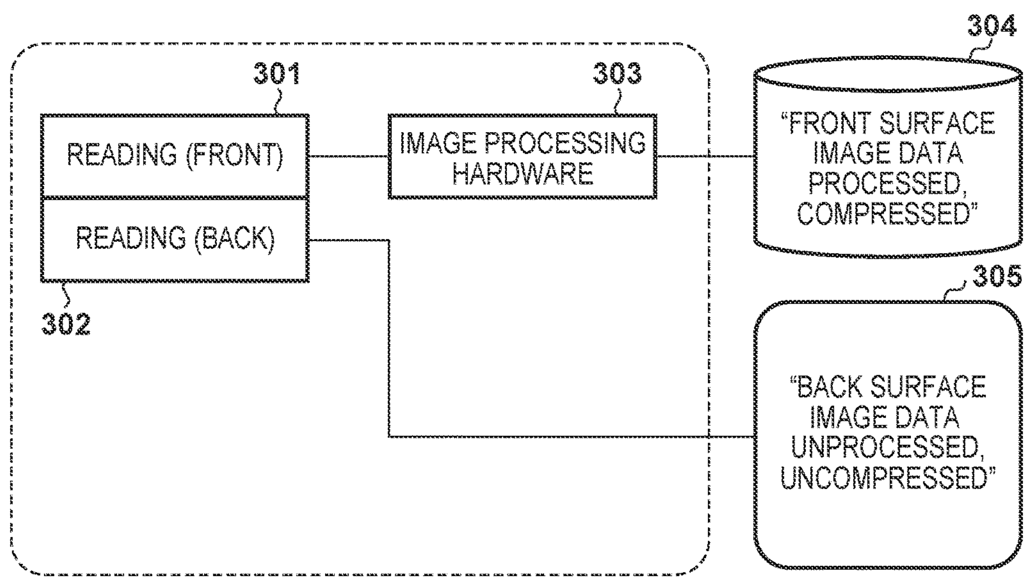
FIGS. 3A and 3B depict views for explaining control at a time of concurrent both-sided reading of an original by the image forming apparatus according to the embodiment.
Figure 3B:
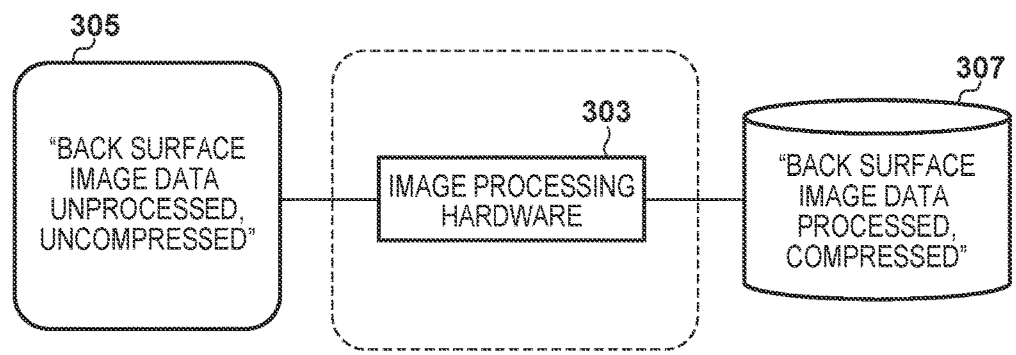

FIGS. 3A and 3B depict views for explaining control at a time of concurrent both-sided reading of an original by the image forming apparatus 101 according to embodiments.

FIG. 3A depicts a view for explaining control when a first original is read for example.

Reading (front) 301 indicates processing for image data of the front surface of an original by the reading unit 104, and outputs image data of the front surface of the original that is read by the reading sensor 203. Image processing hardware 303 indicates hardware, for performing image processing and compression processing, that the image processing unit 103 has, and performs image processing and compression processing on the image data of the front surface of the original that is read by the reading sensor 203. The image data processed in this way is saved as processed front surface image data 304 in a small-sized buffer allocated in the storage unit 108. Because of this, it is possible to image data of the front surface of an original that is obtained by the reading (front) 301 as the front surface image data 304 that is compressed and processed by the image processing hardware 303 in the storage unit 108, without saving raw image data unchanged.

Reading (back) 302 indicates processing for image data of the back surface of an original by the reading unit 104, and outputs image data of the back surface of the original that is read by the reading sensor 204. Here, the image data of the back surface of the original is saved in the storage unit 108 as raw back surface image data 305 that is uncompressed and unprocessed.

In this way, the image forming apparatus 101 controls the reading unit 104 and the image processing unit 103 to control the reading (front) 301, the reading (back) 302, the image processing hardware 303, and storage to the storage unit 108.

Next, FIG. 3B depicts a view for explaining processing performed in accordance with a conveyance interval (sheet interval) with a preceding original before reading an original that is a target of reading.

Here, in a conveyance interval (sheet interval) after having read a previous original until a next original is read, image processing and compression processing by the image processing hardware 303 are performed on raw image data 305 of the back surface of the previous original that is stored in the storage unit 108. In this way, image data 307 of the back surface of the previous original that has been processed and compressed is saved in the storage unit 108.

Figures 3A, 3B, 4:
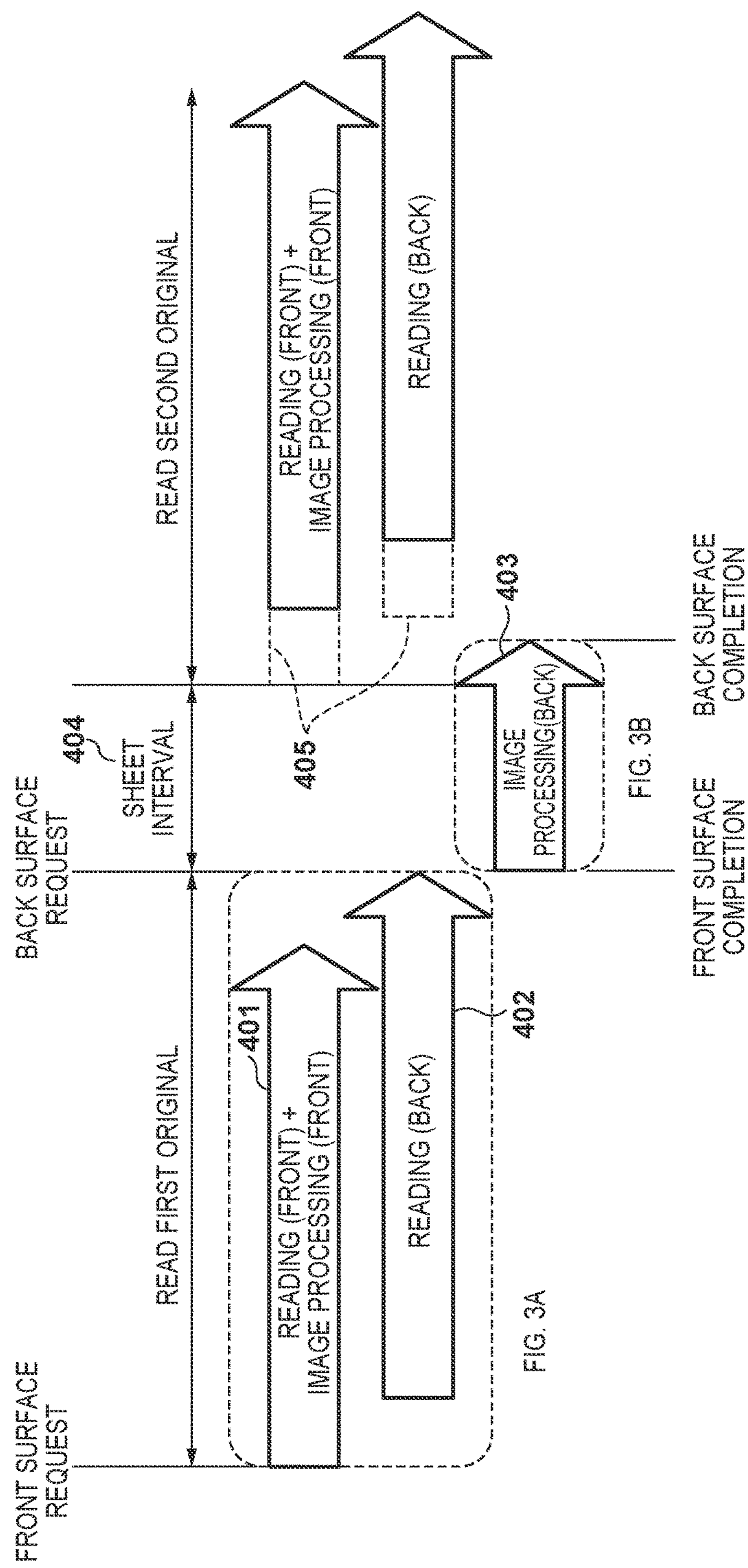
FIG. 4 is a time chart for explaining processing in an image forming apparatus provided with a conventional concurrent both-sided scanner.

FIG. 4 is a time chart for explaining processing in an image forming apparatus provided with a conventional concurrent both-sided scanner. Note that explanation is given in which a configuration of this conventional concurrent both-sided scanner is the same as that in FIG. 2.

Reference numeral 401 denotes processing by the reading (front) 301 and the image processing hardware 303 in a configuration as illustrated by FIG. 3A. Reference numeral 402 denotes processing by the reading (back) 302 in a configuration as illustrated in FIG. 3A. Here, because positions of the reading sensors 203 and 204 are shifted by several centimeters in the sub scanning direction which is the conveyance direction of an original, as illustrated in FIG. 2, start and end timings of processing 401 and processing 402 are shifted by an amount for the difference therebetween. At the end time of the processing 402, a completion notification for front surface data of an original is issued from the reading unit and the image processing unit.

Concurrently with this, a processing request on image data of the back surface (a back surface request) is issued, and processing 403 that is explained with reference to FIG. 3B is started. The processing 403 indicates processing by the image processing hardware 303 of FIG. 3B.

When the processing 403 completes, completion of processing on image data of the back surface (back surface completion) is issued. However, during a conveyance interval (sheet interval) 404 between a first original and a second original, a completion notification for image data of the back surface (back surface completion) of the first original is not received. Accordingly, conveyance of the second original is stopped in the reading unit. Subsequently, when back surface completion with respect to the first original is issued, the reading unit attempts to restart conveyance of the second original, but because a motor for conveyance that is stopped must be driven again, starting of the conveyance and a read operation for the second original is delayed as indicated by reference numeral 405.

A feature of the present embodiment is to enable a completion notification for processing on image data of a back surface of a first original to be issued in an interval (sheet interval) between the first original and the second original, without stopping conveyance of the second original, and to execute a start of conveyance and a read operation of the second original without delay.

FIG. 5 is a time chart for explaining timing when performing concurrent both-sided reading in the image forming apparatus 101 according to the embodiment.

Processing 501 and 502 of FIG. 5 are the same as the previously described processing 401 and 402 of FIG. 4. A point that differs from FIG. 4 is that, at a time of a front surface completion when the processing 501 has finished, a back surface request for requesting image processing on image data of the back surface of the first original to start is issued. By this, the image processing unit 103 starts image processing by the image processing hardware 303 on image data 305 of the back surface of the first original which is still being read. This processing is indicated by reference numeral 503. Here, processing 504 for the first original is something that combines the processing of FIG. 3A and FIG. 3B, and the image processing hardware 303 of the image processing unit 103 is controlled separately for the image data of the front and back of the first original, similarly to the processing of FIG. 3A and FIG. 3B. Accordingly, synchronization control with respect to the reading (back) 302 of FIG. 3A is not performed. Typically, speed of image processing by the image processing hardware 303 is fast in comparison to a read operation by the reading unit 104. Accordingly, there is the possibility that the image data of the back surface of the first original cannot be correctly processed by the image processing in accordance with the image processing hardware 303 completing on the image data of the back surface of the first original that has been obtained by being read by the reading (back) 302, and image data of an unread region of the back surface of the first original being awaited. Accordingly, determination is made as to whether or not to execute the processing 503 as shown in FIG. 5, in accordance with a performance condition determination that is described later with reference to FIG. 8.

If the processing 503 as shown in FIG. 5 is executed, a completion notification of the back surface (back surface completion) is issued from the image processing unit 103 when the processing 504 for the first original has completed. Because a timing for issuing the back surface completion in such a case is a conveyance interval (sheet interval) between the first original and the second original, it is possible to continue to execute reading and image processing of the second original without stopping conveyance of the second original. Because of this, it is possible to increase productivity of the read operation.

FIG. 6 is a flowchart for describing concurrent both-sided reading processing with respect to one original by the image forming apparatus 101 according to the embodiment. Note that this processing is achieved by the CPU 106 deploying a program from the ROM 107 to the storage unit and executing it.

Firstly, in step S601, the CPU 106 accepts a request to read the front surface of an original and perform image processing on image data thereof. Next, the processing proceeds to step S602, the CPU 106 starts processing to read the front surface of the original by the reading unit 104, perform image processing of the image data thereof, and also reads a back surface of the original, and obtain image data of the back surface of the original, as illustrated in FIG. 3A. Next, the processing proceeds to step S603, the CPU 106 determines whether or not the processing 301 (FIG. 3A) for obtaining the image data of the front surface of the original and image processing by the image processing hardware 303 on the image data has completed. Upon completing, the processing proceeds to step S604, but if that is not the case, step S603 is executed.

In step S604, the CPU 106 executes processing for determining whether or not to execute processing described by FIG. 5 which a feature of the present embodiment. This processing is explained later with reference to FIG. 7. Next, the processing proceeds to step S605 and the CPU 106 determines whether or not to perform the processing as shown in FIG. 5 based on a determination result in step S604, and if to perform is determined, the processing proceeds to step S606, and if that is not the case, the processing proceeds to step S612.

In step S606, the CPU 106 makes a notification that processing on the image data of the front surface of the original has completed, and the processing proceeds to step S607. In step S607, the CPU 106 starts image processing on the image data 305 (FIG. 3B) of the back surface of the original, and the processing proceeds to step S608. In step S608, the CPU 106 determines whether or not a request to obtain the compressed image data 307 of the image data of the back surface of the original has been accepted, and if accepted, the processing proceeds to step S609. In step S609, the CPU 106 determines whether or not the reading (back) 302 of the back surface of the original has finished, and if finished, the processing proceeds to step S610. In step S610, the CPU 106 determines whether or not image processing on the image data 305 of the back surface of the original has completed, and if completed, the processing proceeds to step S611 and the CPU 106 makes a completion notification for processing on the image data of the back surface of the original, and this processing finishes.

Meanwhile, in step S605, if the CPU 106 determines not to execute the processing explained by FIG. 5, the processing proceeds to step S612. In step S612, the CPU 106 determines whether or not the reading (back) 302 of the back surface of the original has finished, and if finished the processing proceeds to step S613. In step S613, the CPU 106 performs a completion notification for processing on the image data of the front surface of the original, as illustrated in FIG. 4, and the processing proceeds to step S614. In step S614, the CPU 106 determines whether or not image data of the back surface of the original is requested, and if the image data of the back surface of the original is requested, the processing proceeds to step S615. In step S615, the CPU 106 starts image processing on the image data 305 (FIG. 3B) of the back surface of the original, and the processing proceeds to step S616. In step S616, the CPU 106 determines whether or not image processing on the image data 305 of the back surface of the original has completed, and if completed, the processing proceeds to step S617 and the CPU 106 makes a completion notification for processing on the image data of the back surface of the original, and this processing finishes.

By virtue of the above explained processing, when processing on image data of the front surface of an original completes, if a predetermined condition is satisfied, by immediately starting processing for image data of the back surface of the original, it is possible to start read processing of a succeeding original without delay. Because of this, when reading and processing both sides of an original in parallel, it is possible to execute read processing by a sequence as shown in FIG. 5 without a delay as shown in FIG. 4 from read processing of a current original until read processing of a succeeding original starts.

Figure 7:
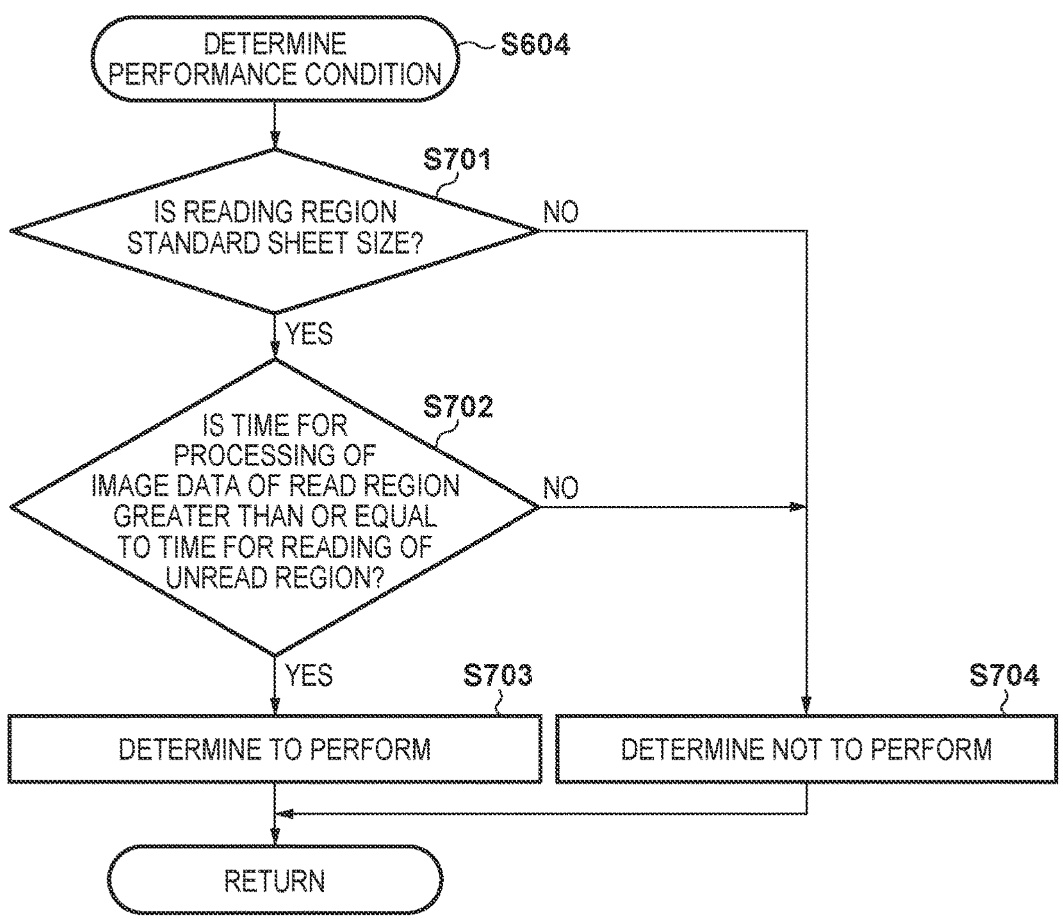
FIG. 7 is a flowchart for describing processing for determining a condition to perform step S604 of FIG. 6.

FIG. 7 is a flowchart for describing processing for determining a condition to perform step S604 of FIG. 6.

As previously explained with reference to FIG. 5, a determination is made as to whether or not a state in which image processing waits for read processing of an original will occur because, while reading the back surface of an original, image processing by the image processing hardware 303 is performed on the read image data of the back surface. If it is predicted that a state in which image processing waits on read processing of an original will occur, processing similar to what is conventional as shown in FIG. 4 is executed, and if this is not the case, the processing as shown in FIG. 5 is executed.

Firstly, in step S701, the CPU 106 determines whether or not a reading region of the original is a standard size, and if it is determines as the standard size, the processing proceeds to step S702, and if not, the processing proceeds to step S704. In step S702, the CPU 106 sets a region of the back surface for which reading by the reading (back) 302 has completed as an already read region and a region to be read as an unread region, and determines whether or not time for image processing on image data of the already read region is greater than or equal to time required for read processing of the unread region. If it is, because read processing of the unread region will completed within the time for image processing on the image data of the already read region, the image processing on the image data of the read region will not wait for read processing of the original. Accordingly, in such a case, as shown in FIG. 5, when processing on the image data of the front surface of the original completes, a determination is made to start the processing on the image data of the back surface of the original, and the processing terminates.

Meanwhile, if the reading region of the original is not a standard size in step S701, the processing advances to step S704 because it is not possible to predict a completion time for read processing of the unread region. In addition, if it is determined in step S702 that read processing of the unread region will not complete within the time of image processing on the image data of the already read region, the processing proceeds to step S704. In step S704, the CPU 106 determines not to perform processing as shown in FIG. 5, and processing terminates.

To explain a concrete example of the processing for determining, for example it is assumed that the reading unit 104 requires 4200 msec to convey an A4 size original, and a distance between the reading sensors 203 and 204 corresponds to 200 msec when converted to conveyance of the original. In addition, it is assumed that 360 msec is required for the image processing hardware 303 to process A4 size image data (a pixel count of 4960×7015 in 600 dpi).

In such a case, when reading of the front surface of an original has completed, the back surface of the original is (4000/4200=0.95) read, and time required for image processing of the image data of the already read region is 360×0.95=342 (msec). In contrast to this, time required for read processing of the unread region of the back surface of the original is 200 msec that is in accordance with the distance between the reading sensors 203 and 204. Accordingly, in this case it is determined in step S702 that read processing of the unread region will complete within the time of image processing on the image data of the already read region, and the processing proceeds to step S703.

In addition, a determination of whether or not a reading region is a standard size is added to the aforementioned condition for a simpler determination. Here, a case of not being a standard size includes a case in which a user arbitrary sets a reading region to not be a standard size defined by the image forming apparatus 101 such as A4 or LTR, and a case in which the size of the original is indefinite and reading is performed until the trailing edge of the original. Therefore, if the reading region is not a standard size, because a guarantee that read processing of an unread region will complete in the time for image processing on image data of an already read region cannot be made, a determination is made not to perform processing as shown in FIG. 5.

By virtue of the embodiment as explained above, in a low-cost image forming apparatus having a small memory capacity, it is possible to read in parallel both sides of an original by reading sensors, and efficiently execute processing for obtaining processed data of the read image data with respect to a plurality of originals.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-088480, filed Apr. 26, 2016 which is hereby incorporated by reference herein in its entirety.

What is claimed is:

1. An image processing apparatus having a reader that can read both sides of an original in parallel, the apparatus comprising:

an image processor that processes image data obtained by the reader reading an original; and a controller that causes the image processor to:

execute in parallel processing on image data obtained by the reader reading a first surface of the original, and reading of a second surface of the original by the reader, wherein the controller determines, after processing by the image processor on the image data obtained by the reader reading the first surface of the original completes, whether or not to start processing by the image processor on image data obtained by the reader reading the second surface of the original while the reader reads the second surface of the original, wherein the controller controls start of the processing by the image processor on the image data obtained by the reader reading the second surface of the original while the reader reads the second surface of the original in a case where the controller determines to start processing by the image processor on image data obtained by the reader reading the second surface of the original while the reader reads the second surface of the original, and wherein the controller controls start of the processing by the image processor on the image data obtained by the reader reading the second surface of the original after the reader has read the second surface of the original in a case where the controller determines not to start the processing by the image processor on image data obtained by the reader reading the second surface of the original while the reader reads the second surface of the original.

2. The image processing apparatus according to claim 1, wherein, when the processing by the image processor on the image data obtained by the reader reading the first surface of the original completes, the controller determines to start the processing by the image processor on image data obtained by the reader reading the second surface of the original, if a first time required for processing by the image processor on image data of an already read region obtained by the reader reading the second surface of the original is greater than or equal to a second time required for the reader to read an unread region of the second surface.

3. The image processing apparatus according to claim 2, wherein the reader has a first reading sensor for reading an image of the first surface of the original and a second reading sensor for reading an image of the second surface of the original, and the first and second reading sensors are arranged at positions that are different to each other in a conveyance direction of the original.

4. The image processing apparatus according to claim 3, wherein the second time required for the reader to read the unread region of the second surface is based on a difference between the positions of the first and the second reading sensors in the conveyance direction of the original.

5. The image processing apparatus according to claim 3, wherein the first and the second reading sensors are line sensors.

6. The image processing apparatus according to claim 1, wherein, if a size of the original is not a standard size, the controller determines not to start the processing by the image processor on the image data obtained by the reader reading the second surface of the original, when processing by the image processor on the image data obtained by the reader reading the first surface of the original has completed.

7. The image processing apparatus according to claim 3, wherein the first and the second reading sensors read images of an original that is during conveyance.

8. The image processing apparatus according to claim 1, wherein processing by the image processor includes compression processing of the image data, and wherein image data obtained by reading the first surface and the second surface of the original is compressed by the compression processing and stored in a memory.

9. The image processing apparatus according to claim 8, wherein, when reading a plurality of originals, when processing by the image processor on image data obtained by the reader reading the first surface of the original completes, if the controller determines to start the processing by the image processor on the image data obtained by the reader reading the second surface of the original, the controller controls to immediately start reading of a first surface and a second surface of a succeeding original after image data obtained by reading of a first surface and a second surface of a preceding original is stored by the memory.

10. A method of controlling an image processing apparatus having a reader that can read both sides of an original in parallel, the method comprising:

processing, by an image processor, image data obtained by the reader reading an original;

causing the image processor to execute in parallel processing on image data obtained by the reader reading a first surface of the original, and reading of a second surface of the original by the reader;

determining, after processing on the image data obtained by the reader reading the first surface of the original completes, whether or not to start processing on image data obtained by the reader reading the second surface of the original while the reader reads the second surface of the original;

controlling start of the processing on the image data obtained by the reader reading the second surface of the original while the reader reads the second surface of the original in a case where it is determined to start processing by the image processor on image data obtained by the reader reading the second surface of the original while the reader reads the second surface of the original; and controlling start of the processing by the image processor on the image data obtained by the reader reading the second surface of the original after the reader has read the second surface of the original in a case where it is determined not to start processing by the image processor on image data obtained by the reader reading the second surface of the original while the reader reads the second surface of the original.

11. A non-transitory computer readable storage medium storing a program for causing a processor to execute a method of controlling an image processing apparatus having a reader that can read both sides of an original in parallel, the method comprising:

processing, by an image processor, image data obtained by the reader reading an original;

causing the image processor to execute in parallel processing on image data obtained by the reader reading a first surface of the original, and reading of a second surface of the original by the reader;

determining, after processing on the image data obtained by the reading unit reading the first surface of the original completes, whether or not to start processing on image data obtained by the reader reading the second surface of the original while the reader reads the second surface of the original;

controlling start of the processing on the image data obtained by the reader reading the second surface of the original while the reader reads the second surface of the original in a case where it is determined to start processing by the image processor on image data obtained by the reader reading the second surface of the original while the reader reads the second surface of the original; and controlling start of the processing by the image processor on the image data obtained by the reader reading the second surface of the original after the reader has read the second surface of the original in a case where it is determined not to start processing by the image processor on image data obtained by the reader reading the second surface of the original while the reader reads the second surface of the original.

* * * * *